Dec. 25, 1962 G. W. POWELL ET AL 3,069,811
BLASTING APPARATUS
Filed Dec. 23, 1958 5 Sheets-Sheet 1
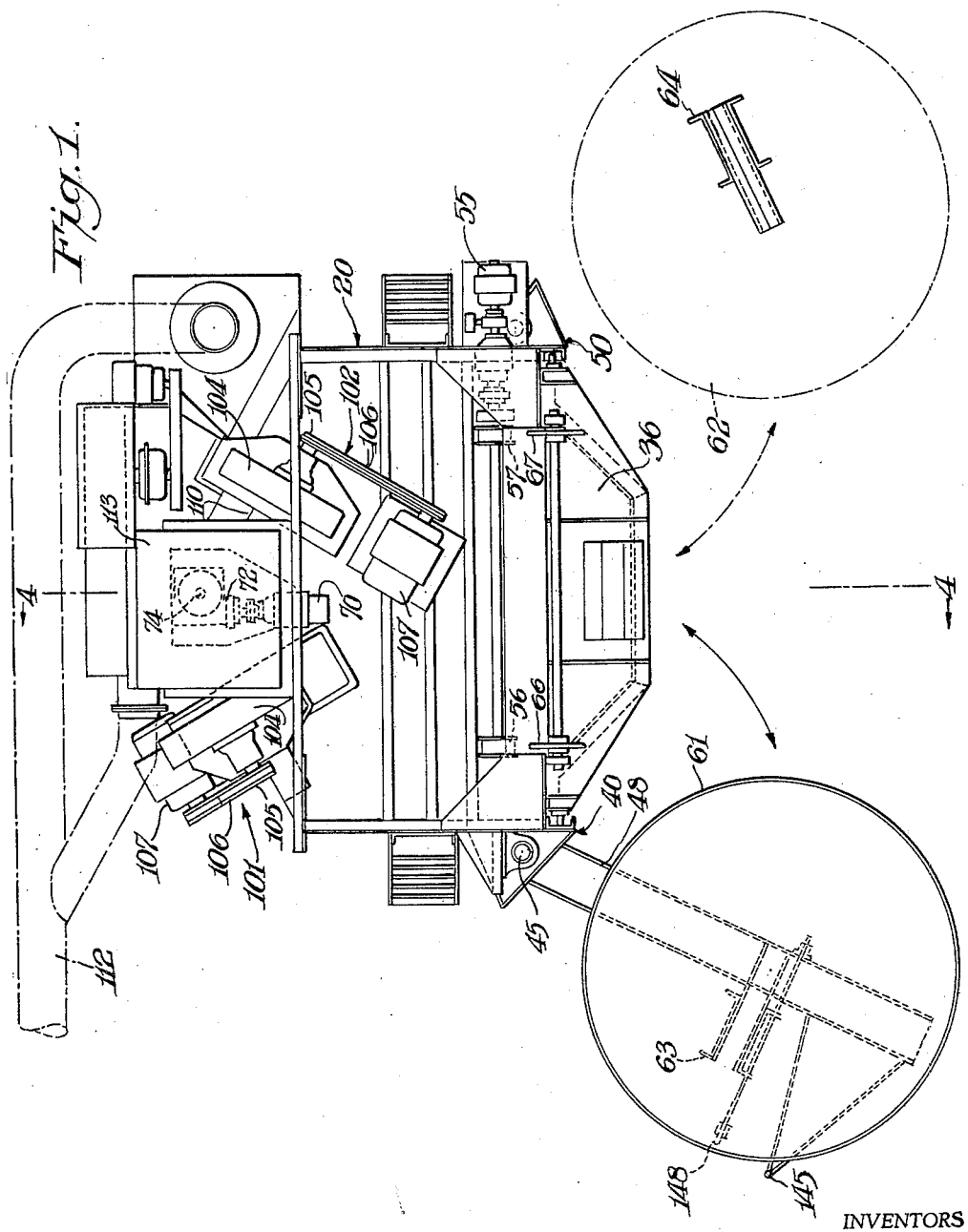
INVENTORS
George W. Powell
Harry F. Bottorf
BY Connolly and Hutz
ATTORNEYS

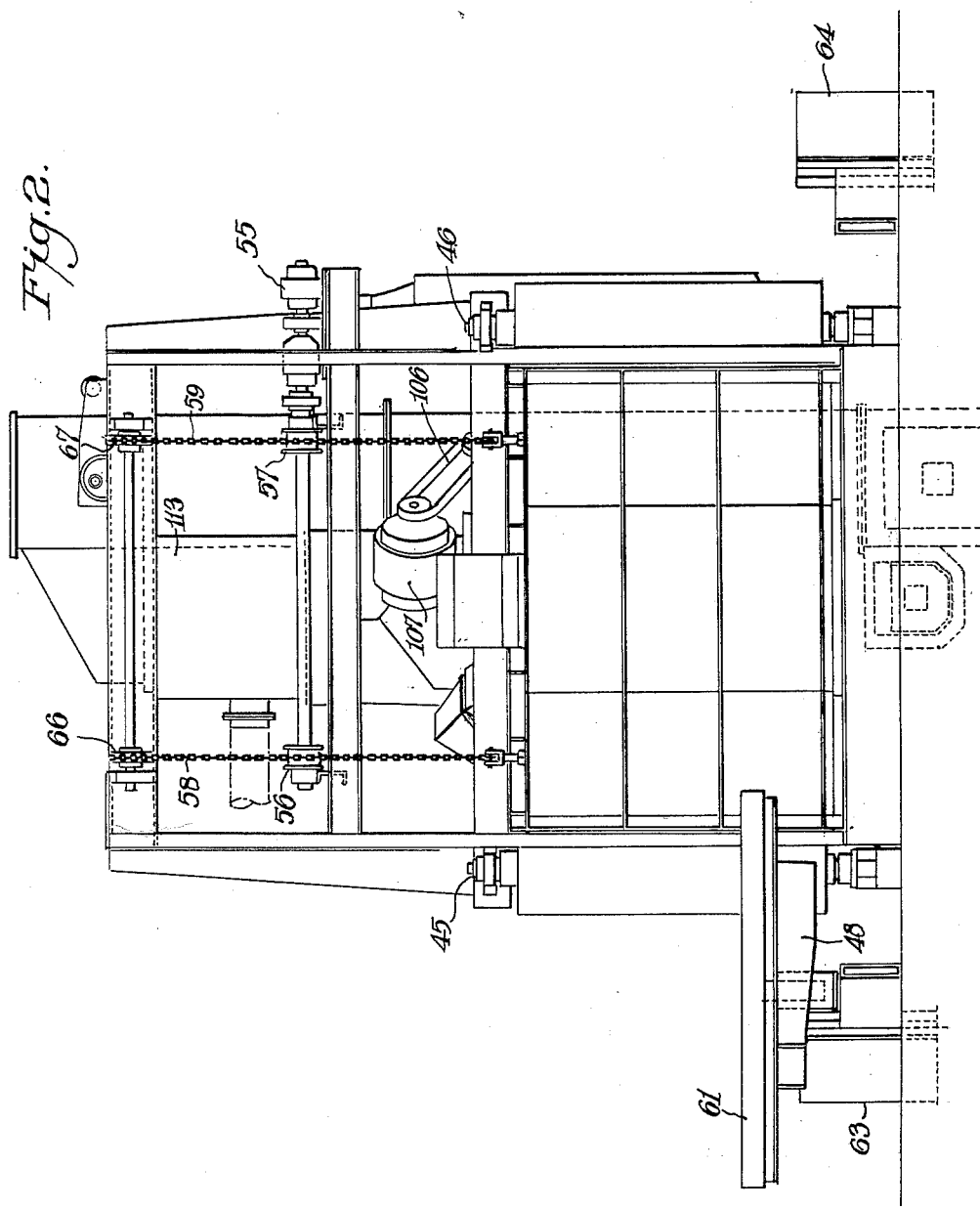

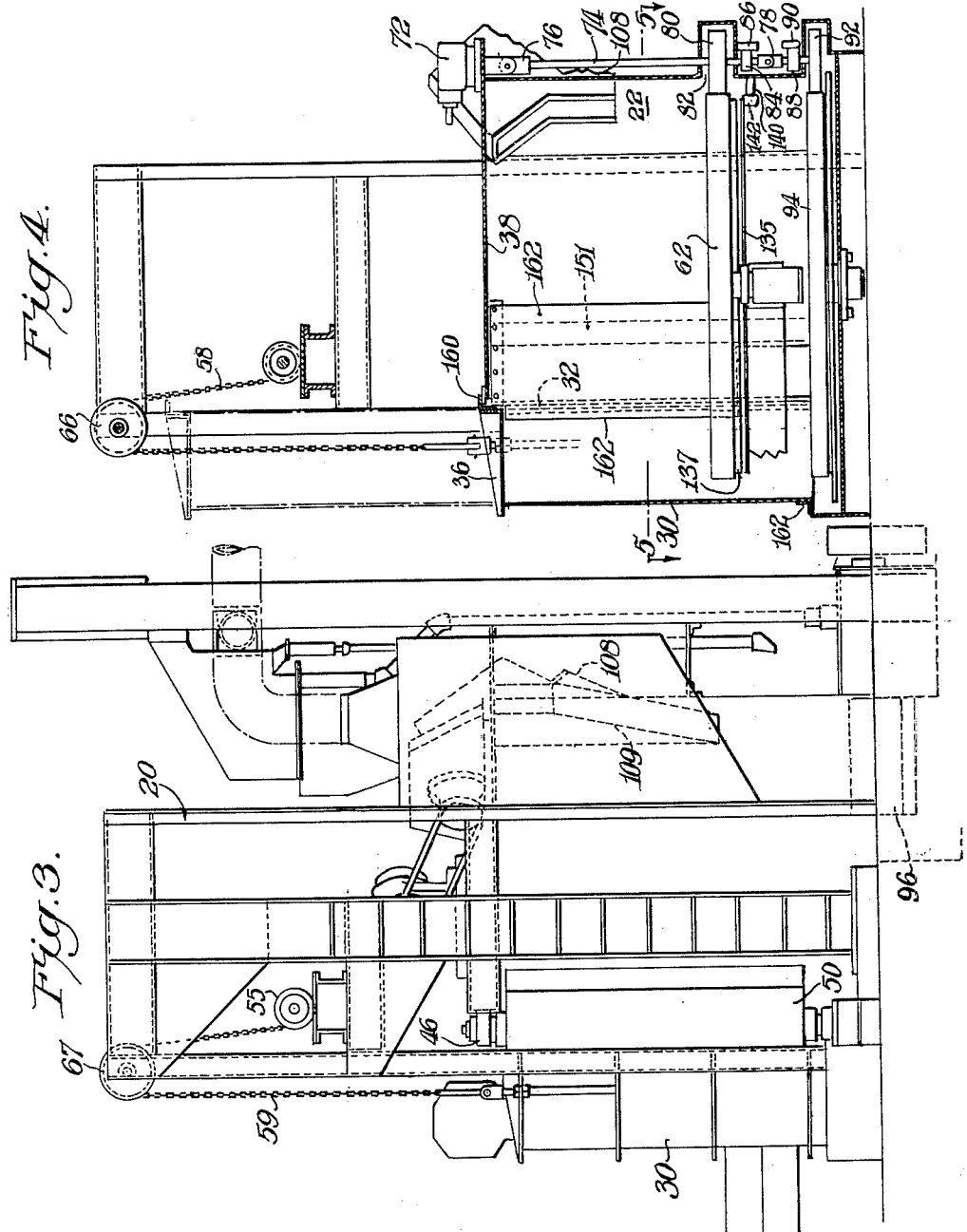

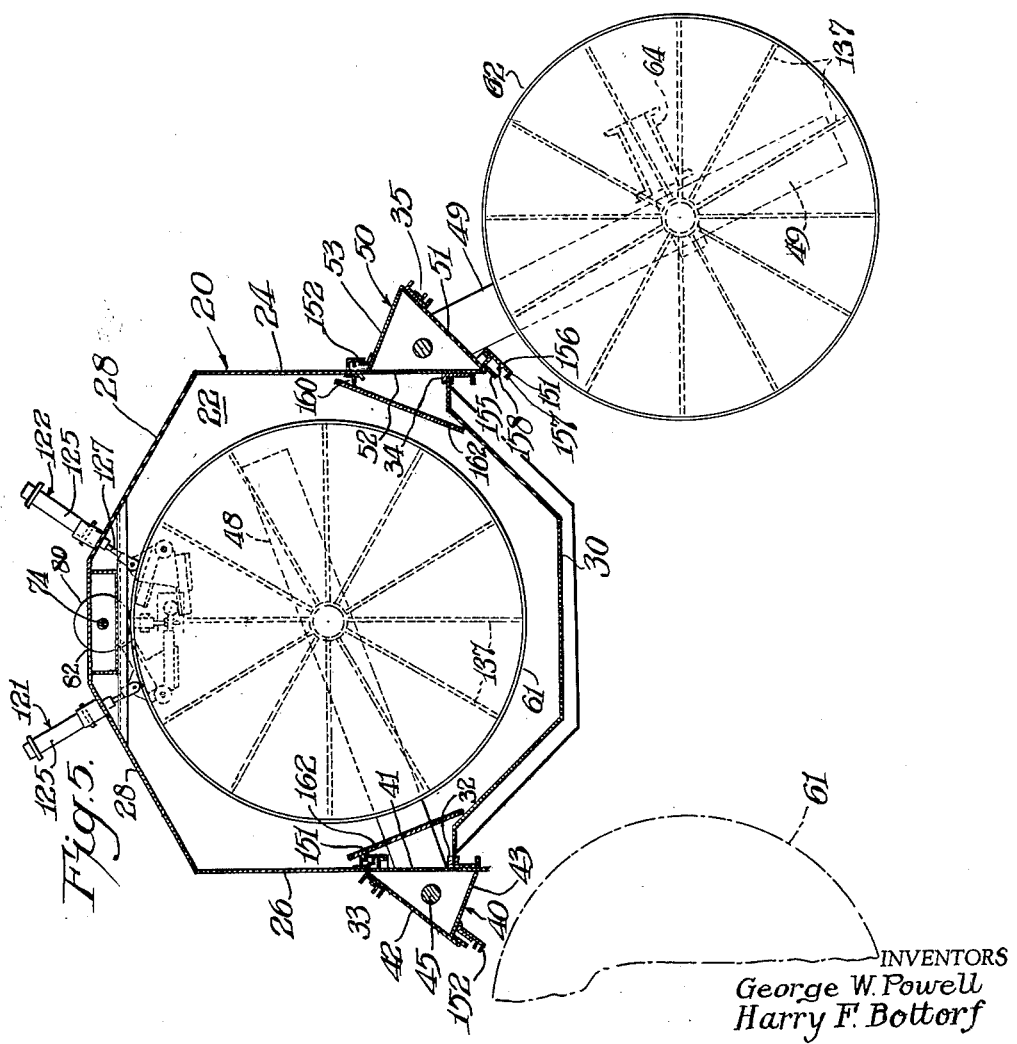

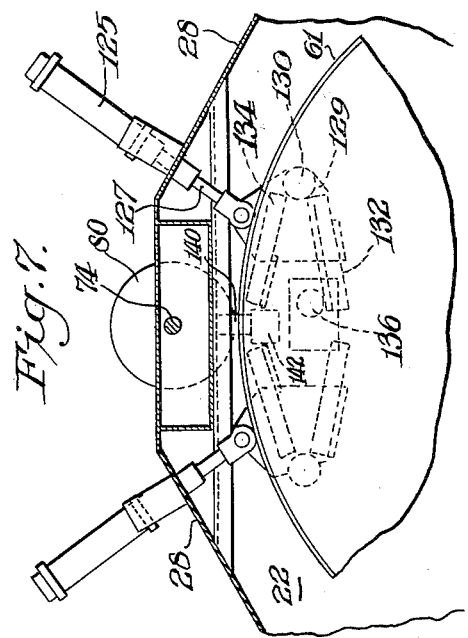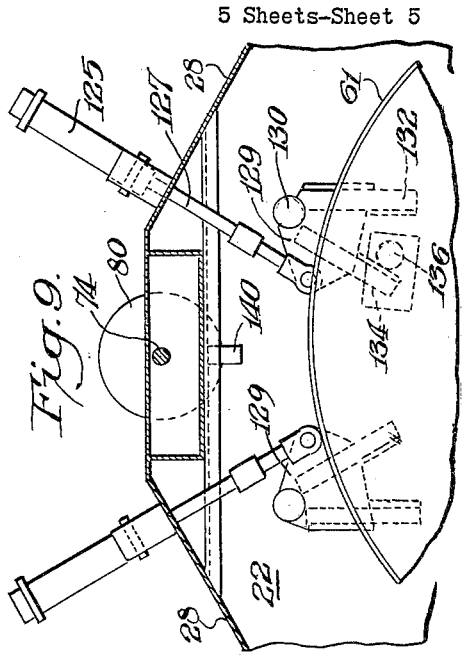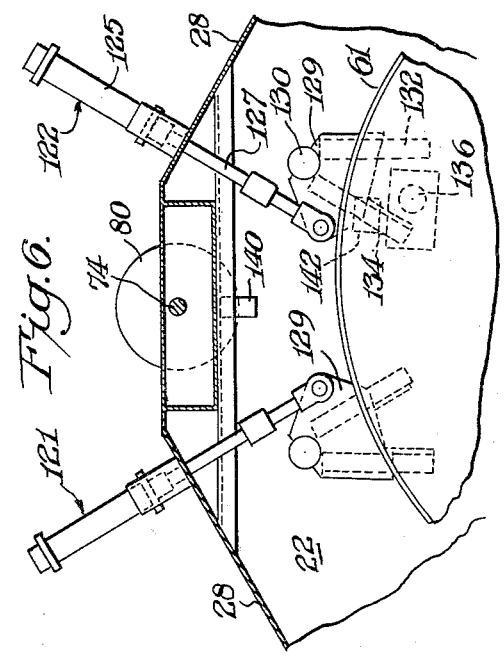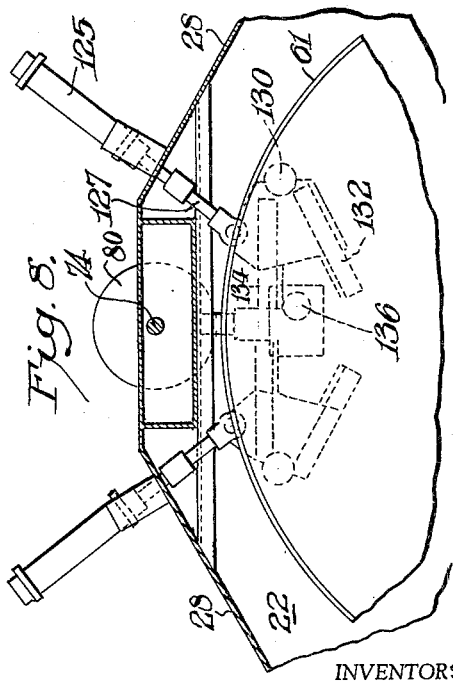

United States Patent Office 3,069,811
Patented Dec. 25, 1962

3,069,811
BLASTING APPARATUS
George W. Powell and Harry F. Bottorf, Jr., Hagerstown, Md., assignors to Pangborn Corporation, Hagerstown, Md., a corporation of Maryland
Filed Dec. 23, 1958, Ser. No. 782,527
10 Claims. (Cl. 51—9)

The present invention relates to apparatus for projecting blastant particles at work pieces and more particularly relatively large work pieces.

Among the objects of the present invention is the provision of novel apparatus of the above kind which enables more expeditious operation than the prior art provides.

The above as well as additional objects of the present invention will be more clearly understood from the following description of several of its exemplifications, reference being made to the accompanying drawings wherein:

FIG. 1 is a plan view of one embodiment of the present invention;

FIG. 2 is a front elevation of the apparatus of FIG. 1;

FIG. 3 is a side elevation of the apparatus of FIGS. 1 and 2 looking at this apparatus from its right;

FIG. 4 is a vertical sectional view of the apparatus of FIGS. 1–3 taken along the line 4—4 of FIG. 1, with parts omitted in the interest of clarity;

FIG. 5 is a horizontal sectional view of the apparatus of FIGS. 1–4 taken along the line 5—5 of FIG. 4, the apparatus being shown in a different operating position; and FIGS. 6, 7, 8 and 9 are detail views similar to that of FIG. 5 showing stages in the operation of the apparatus.

According to the present invention an apparatus for projecting blastant particles at work pieces has a housing defining a blasting compartment, a door for said compartment, a pair of work tables for holding work pieces to be blasted in that compartment, each of said work tables being by itself a snug fit in the compartment, particle blasting structure mounted to project blastant particles on work pieces held in the compartment on a table, and table-carrying arms connected to the tables and the housing to support one table in the compartment with the door sealed while the other is outside being loaded, and enabling the one to be removed from the compartment through the doorway and reloaded while the other is inserted in the compartment through the doorway and the door resealed.

Each of the tables is preferably journalled on the respective table-carrying arms for rotation around a vertical axis and the housing desirably holds drive elements to automatically engage and rotate a table that is sealed within the compartment. One effective form of table-carrying mechanism has swinging arms journalled around pivots mounted externally of the housing. For better sealing of the housing against escape of blastant particles, the housing can have wall apertures adjacent the pivots with the pivots carrying wall portions that seal these apertures when the swinging arm holds a table within the compartment as well as when it holds a table in loading position outside the compartment. In addition, the door can move vertically for opening and closing, with the arm carrying-pivots arranged adjacent respective horizontal ends of the door. The housing can also include latch structure to latch a table in place within the compartment and hold the latched table in engagement with the table rotating mechanism.

Turning now to the drawings, the apparatus there shown has a housing 20 defining a blasting compartment 22. As more clearly shown in FIG. 5, the housing has side walls 24, 26 connected together at the rear by a three panelled rear wall 28. The front of the housing is covered by an externally convex door 30 slidably fitted in vertically directed side guides 32, 34. The top of the door extends toward the rear of the housing to form a partial cover 36 over the housing top. The remainder of the housing top is covered by a roof 38.

The door guides 32, 34 are carried by movable columns 40, 50 of triangular horizontal section. The three faces of column 40 are shown at 41, 42, 43, and the corresponding faces of column 50 at 51, 52, 53. The columns are not integral with the adjacent walls 24, 26 which do not extend forward as far as the door, but the columns fill the spaces between the forward ends of side walls and the door. Each column is journalled on a vertically positioned shaft 45, 46 that can extend the complete height of the housing so that the columns rotate with these shafts.

Swinging arms or booms 48, 49 are secured to the respective columns so that they extend horizontally outwardly and rotate with their respective columns. At the ends of the booms work tables 61, 62 can be mounted to revolve around vertical axes. In this way with the door 30 slid upwardly so that it is out of the way, either boom can be rotated around its column to bring the table it carries into the blasting compartment 22, as shown for table 61 in FIG. 5, or bring that table out so that it rests outside the housing in position for loading, as shown for table 61 in FIG. 1.

Supports such as fixed posts 63, 64 can be provided as by securing to the floor adjacent the housing, to engage the under surface of the tables or booms when they are in the loading or retracted position to relieve the booms and their journals from excessive stresses as when very heavy loads are suddenly placed on the tables.

The door 30 can be arranged for manipulation in any desired manner—by hand, or in the illustrated construction, by electric motor 55 which is connected to reversibly rotate a pair of winding sheaves 56, 57 that carry lifting cables 58, 59 which are looped over overhead rollers 66, 67 and are secured to the upper portion of the door.

At its rear the housing 20 also carries a drive mechanism for rotating the tables when they are in position within the compartment 22. An electric motor 70 conveniently mounted on the housing roof 38 is connected through a speed reducer 72 to a vertically arranged drive shaft 74 mounted between universal joints 76, 78. All these drive members are outside the housing but a friction wheel 80 carried by shaft 74 projects through a slot 82 in the rear of the housing so as to engage the rim of a table when it is in blasting position, as more clearly shown in FIG. 4. A lower bearing 84 helps guide the drive shaft 74 and for more positive engagement with the table rim, a spring 86 can be applied to this bearing to urge it and its shaft toward table-engaging position. Another bearing 88 can also be used along with a spring bias if desired, to hold a second friction driving wheel 92 against the rim of a rotary conveyor disc 94 so as to rotate this disc along with the work table. The rotary conveyor disc can be of the same general size and shape as the table and arranged to simultaneously rotate so as to convey abrasive particles that fall to the bottom of the compartment into a discharge chute 96 for collection and recirculation. The details of this collection and recirculation system are not all described herein since they are generally similar to prior systems such as the one shown in U.S. Patent 2,315,546, granted April 6, 1943.

For projecting the blastant particles on the work pieces held in the blasting compartment 22, it is convenient to use a pair of throwing-wheel assemblies 101, 102. These are preferably mounted so that they project separate streams of particles at different angles toward the top of the table in the housing. Each wheel assembly includes a throwing wheel 104 arranged to project through a slot in the housing roof and/or wall, the wheel being driven through a pulley 105 and a set of belts 106 by means of an electric motor 107. The wheel assemblies can be of the type described in U.S. Patent 2,732,666, granted January 31, 1956, or of any other suitable construction, and can be fed as by ducts 110 from an overhead supply container 113 such as that shown in U.S. Patent 2,716,310, granted August 30, 1955. The housing wall can also be built out along such slots as indicated at 108, 109 to reduce any interference with the path of the blastant particles as they are discharged from the wheels.

To keep from spraying dust and other debris into the atmosphere around the apparatus, it can be fitted with a suction exhaust line 112 connected to a convenient portion of the housing and/or to the blastant recirculation system. The details of such arrangements are also found in the prior art, such as the above Patent 2,716,310.

A feature of the present invention is the provision of latch mechanism to hold the tables in place. Remotely operated units 121, 122 are illustrated as positioned on the rear wall 28 of the housing. These units each include a fluid pressure cylinder 125 externally of that wall and connected to suitable fluid supply, fluid discharge and valve controls. A piston in each cylinder is linked by rod 127 to a separate latch plate 129 carried on a pivot 130 at a level just below the table. Standing up on the top of each latch plate 129 is a pair of latch bars 132, 134 which cooperate with a latch pin 136 projecting downwardly from the lower surface of a blastant-particle-collecting pan 135 under each table. These pans are fixed on the table arms or posts, and do not rotate with the tables. To keep blastant particles from building up on these pans, the tables can be equipped with depending vanes 137 that move or scrape against the tops of the pans.

In operation, with the door 30 open, a loaded table can be swung into the blasting compartment. As shown in FIG. 6, the left-hand table 61 on its way in causes its latch pin 136 to move to a position between latch bars 132, 134 of the right-hand latch 122. A switch, such as a limit switch not shown, then actuates the cylinder 125 causing its piston rod 127 to telescope into the cylinder, thereby rotating the right-hand latch plate in a clockwise direction around its pivot 130. This brings the latch bar 132 up behind the pin 136 and then pushes the pin over to its limiting position illustrated in FIG. 7. This limiting position can be defined by a stationary stop block 140 on the inside surface of the rear housing wall 28, and a cooperating stop block 142 carried on the under surface of the table pan, so that the table rim is in good driving engagement with the friction drive wheel 80. The stop blocks or associated structures may also be provided with a drive switch that automatically energizes the rim drive mechanism when the table reaches its limiting position. The door can then be lowered and the blasting wheel started, preferably with an interlock switch or the like to prevent inadvertent blasting while the door is still open.

When the blasting step is completed, the door is opened and the cylinder 125 is actuated to extend its piston rod 127. This causes the latch plate 129 to rotate in counterclockwise direction bringing the latch bar 134 up against the latch pin 136 as shown in FIG. 8 and then pushing the table out by means of this pin to the positions shown in FIG. 9. The movement of the table away from the friction drive can also be arranged to automatically de-energize the rim driving motor as by deactivating the automatic drive switch.

The use of separate latching mechanisms 121, 122 is convenient inasmuch as the different tables move in different directions, the right-hand latch being in better position for cooperating with the left-hand table, and vice versa. However, a single latching mechanism can be used for both tables, as by having a pair of spaced parallel aligned latch bars extending horizontally in the direction of the width of the compartment and mounted on a pair of discs for rotation around an axis parallel to and below the bars. These bars can have equal radii of rotation with the rotation path arranged so that the space between the bars receives the latch pin from either table, with one bar in front of the pin and the other behind and below the pin, these directions being considered in relation to the pin travel. Rotation of the bar assembly will bring the rear bar up against the back of the pin and then push the pin forward to its limiting position. Unlatching of the table is effected with such an assembly by reversing the assembly rotation, and both such rotations can be accomplished with a single cylinder.

Where dual cylinders are used as in the illustrated construction, both cylinders can be operated simultaneously to simplify the energizing and valve connections, or each can be operated independently to coact with the appropriate table.

The swinging of the tables 61, 62 in and out of the housing can also be power-actuated, or in the interest of simplicity can also be carried out manually. In the illustrated embodiment a hand grip 145 is provided adjacent to and slightly beyond the periphery of each table, preferably connected directly to the swinging arms, so as to enable an operator to conveniently pull or push the table out of or into the compartment. The location of the hand grip should be at the portion of the table which faces the door 30 when the table is in the housing so that the grip can be readily reached. In addition, the hand grip can be positioned so as to have a larger radius around the table columns 45, 46 than that of the supporting posts 63, 64, so that an operator can pull or push the tables through their complete travel and not find the posts in his path. A latch 148 manually controlled and mechanically engaging between the arms and the supporting posts 63, 64 is also an advantageous feature in order to make sure that the tables stay in retracted position on the posts until ready for insertion in the blasting housing. The mechanical latch control should be located near the hand grip 145 as indicated so that a single operator can manipulate both conveniently. It is desirable to have the mechanical latch of the automatic type that latches the table arm to the support post without any manipulation on the part of the operator when the table comes into the loading position above the post. Manipulation would then be needed only for the purpose of unlatching the table arm from the post when the table is ready to be returned to the blasting compartment.

The power operated latch arrangement described above for use within the compartment is particularly desirable since it does not require any manual effort on the part of an operator to urge the table into the proper drive position against its spring-loaded driving wheel 80. In addition, the opening of the power latch supplies enough effort to start the table in its movement from the compartment so that the operator does not have to manually overcome the table's inertia, which can be quite a problem. The spring biasing of the driving wheel 80 can also help overcome the table's inertia. The bearing supports for the table arms are readily made sufficiently friction-free that once the table starts moving out with its arm, it is only necessary for the operator to supply a very little force to keep the table moving until it reaches the loading position over the outer supports.

If desired, the latch connection between the table arms and the outer supports can also be made of the power actuated type such as is illustrated above in connection with the blasting compartment, to help overcome the inertia in starting a loaded table from loading position on its way toward the compartment. On the other hand, a manual latch mechanism can be used within the compartment where the spring biasing of the driving wheel is sufficient to overcome the above inertia, or where this inertia is not a problem, as for example with power operated table arms.

The latches for the loading position and/or blasting position can also be located in other positions, on portions of the arms close to their pivots 45, 46, for example.

Another feature of the present invention is the effective sealing of the blasting compartment notwithstanding the presence of structure that permits bringing the tables in and out. As shown more fully in FIG. 5, the columns 40, 50 are provided on their faces 41, 51 as well as on their faces 43, 53, with sealing strips which seal against the adjacent edges of the housing walls 26, 24. Strips 151 in each column seal against the inner faces of the wall edges when the columns are rotated to bring the tables within the housing, and strips 152 seal against the outer faces of these wall edges when the columns are rotated to bring the tables to their loading positions. Sealing strips 151, 152 can be of identical form provided with a yieldable flap 155 made of rubber for example, backed up by an angle bar 156 that carries ribs 157, 158 to break up any direct leakage path provided where the flap should tear or not seal properly. Both the outer and inner faces of the edges of the walls 24, 26, or only the inner faces, can be provided with a mating sealing strip 160 having flanges that mesh with the ribs 157, 158 and overlap them.

Further sealing can be provided, if desired, by auxiliary covers such as the rubber curtains 162 conveniently hung from the housing roof 38 so as to overlay the above seals and act as an additional baffle. The curtains can have their lower edges notched out in front to make room for the table carrying arms.

The door guides 32, 34 are also provided in duplicate as indicated at 33, 35, so that the rotation of the columns 40, 50 withdraws one of the guides from door guiding position and replaces it by the other. Guides such as those illustrated that are closely fitted against both faces of each door edge are generally sufficient for adequate sealing at these locations. Sealing of the door against the roof is readily completed as by means of an overlapping flange 169 projecting rearwardly from the top 36 of the door so that it overlaps the front edge of roof 38. The lower edge of the door is conveniently sealed as by having it close down behind an upright flange 162 extending up from the floor, or if desired, recessed in the floor itself.

A modified arrangement for using the apparatus of the present invention is to provide pushbutton switches for an operator to manipulate, with one switch connected to operate a latch for latching a table in place within the housing and simultaneously to actuate the door closing mechanism. A limit switch on the above latch then automatically energizes the table rotating drive when the latching is completed and a limit switch on the door automatically starts the blasting when the door reaches its fully closed position. A different pushbutton can be connected to stop the blasting with an automatic interlock to open the door and unlatch a table when the blasting has come to a complete halt. Such an automatic interlock can be merely a centrifugal switch or pair of switches connected to rotate with the throwing wheels and kept from closing their circuit by such rotation, but biased so as to close their circuits when their rotation stops.

Obviously many modifications and variations of the present invention are possible in the light of the above teachings. It is, therefore, to be understood that within the scope of the appended claims the invention may be practiced otherwise than as specifically described.

What is claimed is:

1. An apparatus for projecting blastant particles at work pieces, said apparatus having a housing defining a blasting compartment, a door for said compartment, a pair of work tables for holding work pieces to be blasted in that compartment, each of said work tables being by itself a snug fit in the compartment and the compartment being too small to simultaneously hold both tables, particle blasting structure mounted to project blastant particles on work pieces held in the compartment on a table, and table-carrying arms connected to the tables and the housing to support one table in the compartment while the other is outside being loaded, the respective arms being rotatably pivoted at different locations with respect to the housing so that one can withdraw a table from the compartment through the doorway for reloading and the other arm can then introduce the other table into the compartment through the doorway.

2. The combination of claim 1 in which each of the tables is journalled on the respective table carrying arms for rotation around a vertical axis, and the housing holds drive elements connected to automatically engage and rotate the table sealed within the compartment.

3. The combination of claim 1 in which the table carrying arms are journalled around pivots mounted externally of the housing.

4. The combination of claim 3 in which the housing has wall apertures adjacent the pivots, and the pivots carry wall portions that seal these apertures when an arm holds a table within the compartment as well as when it holds a table in loading position outside the compartment.

5. The combination of claim 3 in which the door is a vertically moving one, and the arm pivots are adjacent the respective sides of the door.

6. The combination of claim 1 in which the housing includes latch structure connected to latch a table in place within the compartment.

7. The combination of claim 2 in which the drive elements also include latch structure to latch a table in place within the compartment and hold the latched table in engagement with table rotating mechanism.

8. The combination of claim 7 in which the latch structure is power-operated and is connected to apply its power operation to start the table out of the compartment when the table is unlatched.

9. The combination of claim 1 in which support posts are located outside the compartment to support the tables in loading position.

10. An apparatus for projecting blastant particles at work pieces, said apparatus having a housing defining a blasting compartment, a door for said compartment, a manually inserted and manually removed work table for holding work pieces to be blasted in that compartment, particle blasting structure mounted to project blastant particles on work pieces held in the compartment on the table, and table-carrying mechanism connected to guide the table in and out of the compartment, said mechanism including power-operated latch means in the compartment connected to hold the table in blasting position during blasting, and to start the table out of the compartment when the blasting is completed.

References Cited in the file of this patent

UNITED STATES PATENTS

| 2,231,951 | Rosenberger | Feb. 18, 1941 |
| 2,276,345 | Rosenberger | Mar. 17, 1942 |
| 2,315,546 | Rosenberger | Apr. 6, 1943 |

FOREIGN PATENTS

| 1,031,540 | France | June 24, 1953 |
| 696,388 | Great Britain | Aug. 26, 1953 |